Dec. 8, 1942.   H. L. KRAEFT   2,304,696
BICYCLE FRAME AND HEAD SHROUD THEREFOR
Filed March 18, 1941

INVENTOR.
Herman L. Kraeft.
BY Fay, Macklin, Golrick and Williams
ATTORNEYS.

Patented Dec. 8, 1942

2,304,696

UNITED STATES PATENT OFFICE 2,304,696

BICYCLE FRAME AND HEAD SHROUD THEREFOR

Herman L. Kraeft, Cleveland Heights, Ohio, assignor to The Murray-Ohio Manufacturing Company Application March 18, 1941, Serial No. 383,972

3 Claims. (Cl. 280—274)

This invention relates, as indicated, to bicycle frames, but has reference more particularly to a head shroud for such frames.

In forming bicycle frames, it has been the practice, heretofore, to permanently secure a head cluster consisting of a tubular head and tubular elements extending therefrom to the reach and other frame bars by butt-welding the head cluster elements to such frame bars. The welding operations usually result in the formation of flash at the butt-welded joints, which flash must be removed before the frame can be properly finished. The removal of such flash is, in some cases, extremely difficult, due to the lack of space at this point of the frame for properly using grinding equipment.

The present invention has, among its objects, the avoidance of the necessity of removing all of the flash at the butt-welded joints, the reduction to a minimum of the handling of grinding equipment as well as the frame during the frame assembling operations, and the improvement generally of the appearance of the bicycle in the region of the head cluster by the attachment thereto of a head shroud which can be easily and quickly mounted on such cluster and which effectively conceals the unremoved flash at the welded joints.

Other objects and advantages of the invention will be apparent during the course of the following description.

In the accompanying drawing, forming a part of this specification, and in which like numerals are employed to designate like parts throughout the same, Fig. 1 is a fragmentary side elevation of a portion of a bicycle having the head shroud of the present invention mounted thereon;

Fig. 4 is a cross-sectional view, taken on the line 4—4 of Fig. 1;

Figure 1:
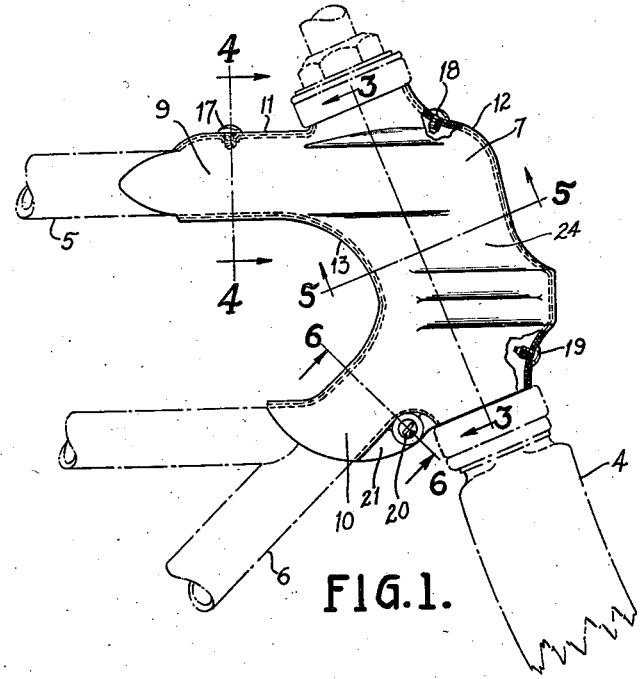
Figure 3:
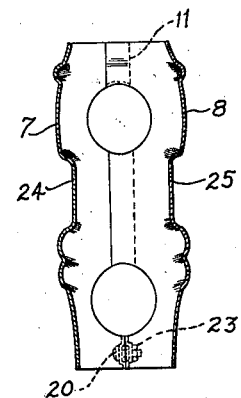
Fig. 3 is a cross-sectional view, taken on the line 3—3 of Fig. 1.

In forming the frame of the bicycle, which, in the present instance is illustrated as a bicycle of conventional construction, a front steering fork supporting head cluster is provided consisting of a tubular head 1 having short angularly related tubular elements 2 and 3 extending therefrom, the elements 2 and 3 being of smaller diameter than the head 1. The tubular head 1 forms the main support for the stem or spindle of the steering fork assembly generally indicated at 4 in Fig. 1.

The head cluster is adapted to be permanently secured to the frame of the bicycle and for this purpose, the element 2 is butt-welded to the upper reach bar 5 of the frame and the element 3 is butt-welded to the lower frame bar 6 of the frame, this welding being accomplished by means of suitable electric resistance welding equipment (not shown).

Figures 7, 8:
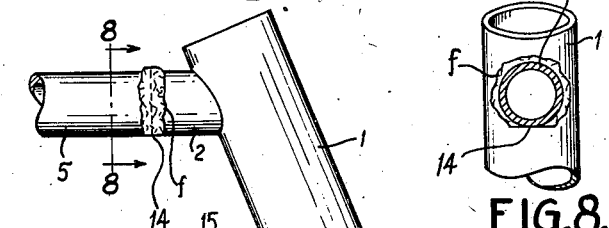
Fig. 7 is a view similar to Fig. 1, but with the head shroud removed.
Fig. 8 is a cross-sectional view, taken on the line 8—8 of Fig. 1.
Figure 9:
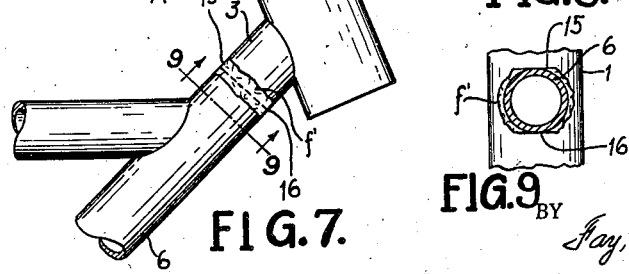
Fig. 9 is a cross-sectional view, taken on the line 9—9 of Fig. 7.

As a result of such butt-welding operations, "flash" is formed which extends entirely around the welded joints, as indicated by $f$ and $f'$ in Figs. 7, 8 and 9. This flash must be removed before the frame can be subjected to the necessary finishing operations, and, in the past, grinding wheels have been employed for this purpose. It is, however, extremely difficult to manipulate the grinding wheel and/or frame in a manner to satisfactorily remove all of such flash.

Figure 2:
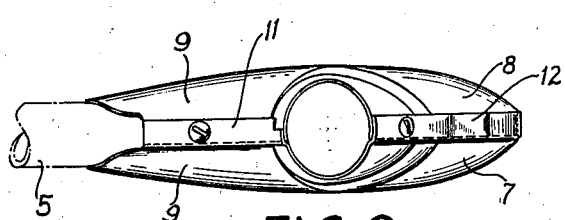
Fig. 2 is a top plan view of the head shroud.

In order to avoid the necessity of removing all of the flash, to reduce to a minimum the handling of the grinding wheel or other grinding equipment and the frame, as well as to generally improve the appearance of the bicycle in the vicinity of the head cluster, I mount a shroud on such cluster in the manner shown most clearly in Figs. 1 and 2.

The shroud comprises a pair of similar sheet metal stampings or shells 7 and 8 shaped generally to fit loosely over the tubular head 1, and each provided with wing portions or extensions 9 and 10, which are respectively adapted to fit over the welded joints to which reference has been made as well as to enclose adjoining portions of the frame, as clearly shown in Fig. 1. The shell 7 is provided with offset flanges 11, 12 and 13, which overlap the corresponding edge portions of the shell 8.

Figure 5:
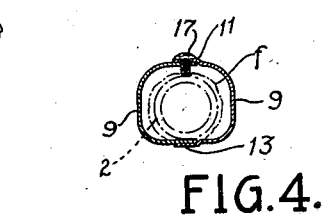
Fig. 5 is a cross-sectional view, taken on the line 5—5 of Fig. 1.
Figure 6:
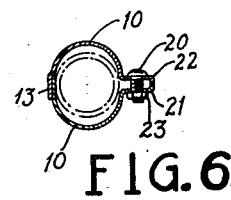
Fig. 6 is a cross-sectional view, taken on the line 6—6 of Fig. 1.

Prior to mounting the shroud on the head cluster, the flash $f$ is ground off at the point 14 (Figs. 7 and 8) to provide a flat surface which is tangential to the external surfaces of the element 2 and reach bar 5, and the flash $f'$ is ground off at the points 15 and 16 (Figs. 7 and 9) to provide parallel flat surfaces which are tangential to the external surfaces of the element 3 and the lower frame bar 6. These portions of the flash can be ground off by means of extremely simple grinding equipment and with a minimum amount of handling of such equipment or of the bicycle frame. Moreover, these ground flat surfaces are of advantage in accurately and properly locating the shroud, since the edge portions of the shell 8 over which the flange 13 of the shell 7 fits can be brought into engagement with these surfaces as clearly shown in Figs. 4 and 6. As a further aid in locating the shroud, an edge portion of the shell 8 over which the flange 13 of the shell 7 fits is brought into engagement with the rear surface of the tubular head 3, as clearly shown in Fig. 5.

After the shells 7 and 8 have been assembled on the head cluster, a number of screws are used to hold them in assembled relation as well as firmly secured to the cluster head. For this purpose, a screw 17 is passed through the flange 11, the underlying edge portion of the shell 8 and into engagement with the flash f. Screws 18 and 19 are passed through the flange 12 and the underlying edge portion of the shell 8. A screw 20 is then passed through flanges 21 and 22 formed on the shells 7 and 8 respectively, and this screw is retained in position by means of a nut 23. These flanges 21 and 22 further act as spacers to space the extensions 10 of the shells 7 and 8 from the flash f'.

The shroud is preferably formed to provide two flat surfaces 24 and 25, to which plates bearing the name of the bicycle or the maker thereof may be secured.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In combination with a bicycle frame comprising a tubular head, a reach bar and a lower frame bar permanently connected together; a head shroud comprising a pair of complementary sheet metal shells enclosing said head and adjacent portions of said reach and frame bars to conceal the points of connection between the bars and the head, said shells having overlapping edge portions extending substantially throughout the full extent of the meeting edges of the shells and disposed substantially in the median vertical plane of said frame, and means extending through said overlapped edges for maintaining said shells in assembled relation upon the frame.

2. In combination with a bicycle frame comprising a tubular head, a reach bar and a lower frame bar permanently connected together; a head shroud comprising a pair of complementary sheet metal shells enclosing said head and adjacent portions of said reach and frame bars to conceal the points of connection between the bars and head, said shells having overlapping edge portions extending substantially throughout the full extent of the meeting edges of the shells, means extending through said overlapped edges for maintaining said shells in assembled relation, one of said means extending through said overlapped edges engaging with said reach bar for locating said shroud in proper position.

3. In combination with a bicycle frame comprising a tubular head, a reach bar and a lower frame bar permanently connected together, the reach bar having a flat surface portion adjacent to the head and the lower frame bar having a flat surface portion adjacent the head; a head shroud comprising complementary sheet metal stampings enclosing said head and adjacent portions of said reach and frame bars to conceal the points of connection between the bars and head, said shells having overlapping edge portions extending substantially throughout the full extent of the meeting edges of the shells, one of said stampings having its edge portions engaging said flat surfaces on said bars for accurately locating said shroud in position on said frame, and means extending through said overlapped edges for maintaining said shells in assembled relation.

HERMAN L. KRAEFT.